US008369407B2

(12) United States Patent
Saoudi et al.

(10) Patent No.: US 8,369,407 B2
(45) Date of Patent: Feb. 5, 2013

(54) METHOD AND A SYSTEM FOR INDEXING AND SEARCHING FOR VIDEO DOCUMENTS (75) Inventors: Aïssa Saoudi, Cergy Saint Christophe (FR); Hassane Essafi, Orsay (FR)

(73) Assignee: Advestigo, Saint Cloud (FR)

( * ) Notice: Subject to any disclaimer, the term of this patent is extended or adjusted under 35 U.S.C. 154(b) by 1111 days.

(21) Appl. No.: 12/154,671

(22) Filed: May 23, 2008

(65) Prior Publication Data

US 2009/0292701 A1    Nov. 26, 2009

(51) Int. Cl.
 *H04N 7/12* (2006.01)
(52) U.S. Cl. .................................................. 375/240.16
(58) Field of Classification Search ............ 375/240.01–240.29; 348/700–702; 382/155, 156, 157, 382/160, 165, 173, 225, 236, 170, 209
See application file for complete search history.

(56) References Cited

U.S. PATENT DOCUMENTS

| 6,549,245 | B1 * | 4/2003 | Lee et al. ...................... 348/700 |
| 8,023,773 | B2 * | 9/2011 | Brunk et al. .................. 382/305 |
| 2003/0091235 | A1 * | 5/2003 | Xiong ........................... 382/199 |
| 2006/0048191 | A1 * | 3/2006 | Xiong ............................. 725/52 |
| 2007/0110089 | A1 * | 5/2007 | Essafi et al. .................... 370/420 |
| 2009/0083228 | A1 * | 3/2009 | Shatz et al. ......................... 707/3 |

FOREIGN PATENT DOCUMENTS

WO    WO 2005/055086    6/2005

OTHER PUBLICATIONS

Deriche, R., Using Canny's Criteria to Derive a Recursively Implemented Optimal Edge Detector, 1987, International Journal of Computer Vision, pp. 167-187.*

Pan, Xuefeng et al., "Visual Features Extraction Through Spatiotemporal Slice Analysis," Advances in Multimedia Modeling; Lecture Notes in Computer Science; LNCS, Springer, vol. 4352, Jan. 9, 2007, pp. 304-313.

Ngo, Chong-Wah et al., "Video Partitioning by Temporal Slice Coherency," IEEE Transactions on Circuits and Systems for Video technology, vol. 11, No. 8, Aug. 1, 2001, pp. 941-953.

Hampapur, Arun et al., "Comparison of Sequence Matching Techniques for Video Copy Detection," Proceedings of the SPIE—the International Society for Optical Engineering, SPIE, vol. 4676, Jan. 1, 2002, pp. 194-201.

Saoudi, Aïssa, et al.: "Spatio-Temporal Video Slice Edges Analysis for Shot Transition Detection and Classification," International Journal of Signal Processing (IJSP), pp. 189-194, vol. 4 No. 1, (2007). ISSN 1304-4478.

* cited by examiner

*Primary Examiner* — Sath V Perungavoor
*Assistant Examiner* — James Pontius
(74) *Attorney, Agent, or Firm* — Preti Flaherty Beliveau & Pachios LLP (57) ABSTRACT

A method of indexing a video document represents the video document in the form of a parallelepipedal volume obtained by juxtaposing, on a time axis, successive frames of the video document where each frame is represented by a matrix of pixels in a two-dimensional space. A space-time video slice of the video document is constructed by extracting a set of pixels for each frame of the video document in a same line defined relative to a first direction of the frames and juxtaposing the lines of pixels corresponding to the frames on a time axis to form a space-time video slice of a length defined by the juxtaposed lines of pixels and of a height equal to the length of the lines extracted from each of the frames. The length is a function of the dimension of the frames in a second direction and the orientation of the lines. The colorimetric values of the pixels of the lines of the space-time video slice are initialized on the basis of the content of the lines extracted from the frames of the video document.

17 Claims, 8 Drawing Sheets

METHOD AND A SYSTEM FOR INDEXING AND SEARCHING FOR VIDEO DOCUMENTS

The present invention relates to a method and a system for indexing and searching for video documents.

Diverse information search systems applied to video documents are already known, of which the main two methods are indexing a video document and/or a video document database and searching for a query document in relation to that database or that reference video document.

In practice, it is useful to be able to detect in large video document databases complete copies as well as partial copies, in order in particular to be able:

- to detect video documents (films, video clips), shared illegitimately in peer-to-peer networks;
- to detect automatically duplicated or prohibited video documents in video document sharing sites;
- to monitor television streams to verify, for example, if an advertisement has been broadcast.

Known information search systems often apply to very specialized fields, however, or involve processing a very large volume of information, leading to slow and complex processing of information.

The present invention aims to remove the aforementioned drawbacks and to improve methods for indexing and searching for video documents by increasing reliability, reducing calculation times, and enabling processing of a large number of video documents.

The invention achieves the above objects through a method of indexing a video document, comprising the following steps:

(a) representing the video document in the form of a parallelepipedal volume obtained by juxtaposing on a time axis K successive frames constituting the video document, each frame being represented by a matrix of pixels in a two-dimensional space; and (b) constructing a space-time video slice of the video document by extracting a set of pixels for each frame of the video document in the same line defined relative to a first direction of the frames, juxtaposing the K lines of pixels corresponding to the K frames on a time axis to form a space-time video slice of length defined by the K juxtaposed lines of pixels and of height equal to the length of the lines extracted from each of the frames, which length is a function of the dimension of the frames in the second direction and the orientation of the lines, and initializing the calorimetric values of the pixels of the K lines of the space-time video slice on the basis of the content of the lines extracted from the K frames of the video document.

The lines of pixels can be straight line segments.

In another embodiment, the lines of pixels are curved lines.

In one particular embodiment, curved lines of pixels are of spiral shape.

In one advantageous embodiment, the method of indexing a video document comprises the following steps:

(a) representing the video document in the form of a parallelepipedal volume obtained by juxtaposing on a time axis K successive frames constituting the video document, each frame being represented by a matrix of pixels in a two-dimensional space; and (b) constructing a space-time video slice of the video document by extracting a segment of pixels for each frame of the video document in the same direction at a predetermined angle α relative to a first direction of the frames, juxtaposing the K segments of pixels corresponding to the K frames on a time axis to form a space-time video slice of length defined by the K juxtaposed pixel segments and of height equal to the length of the segments extracted from each of the frames, which length is a function of the dimension of the frames in the second direction and the angle α, and initializing the colorimetric values of the pixels of the K segments of the space-time video slice on the basis of the content of the segments extracted from the K frames of the video document.

The height of a space-time video slice depends on the angle α formed by the K segments of the space-time video slice relative to the first direction of the frames, the width, and the height of the frame, as follows:

$$H_{STVS^\alpha} = \begin{cases} \left|\frac{W_{frame}}{\cos\alpha}\right| & \text{if } (\alpha_{diag} < \alpha < \alpha_{diag} ou \pi\alpha_{diag} < \alpha < \pi + \alpha_{diag}) \\ \left|\frac{H_{frame}}{\sin\alpha}\right| & \text{Otherwise} \end{cases}$$

where $\alpha_{diag}$ represents the angle between the first diagonal in a frame and one of the lines in the first direction x, and where:

$$\alpha_{diag} = \arctan\left(\frac{W_{frame}}{H_{frame}}\right)$$

The calorimetric values of the l pixels of the K segments of the space-time video slice are initialized on the basis of the content of the segments extracted from the K frames of the video document by the following function:

$$STVS_\alpha(l, k) = Tr_k\left(\left(l - \frac{H_{STVS\alpha}}{2}\right)*\sin(\alpha) + \frac{H_{frame}}{2}, \left(\frac{H_{STVS\alpha}}{2} - l\right)*\cos(\alpha) + \frac{W_{frame}}{2}\right)$$

where: $l = 0 \ldots (H_{STVS_\alpha} - 1)$

Space-time normalization of the space-time video slices is advantageously effected by space normalization of the dimensions of the frames relative to a fixed reference height and time normalization of the number of frames per second relative to a fixed reference number of frames per second.

In one step of the method of the invention, contours present in space-time video slices are detected by calculating the gradient images of the space-time video slices and binarizing those gradient images.

The histogram of occurrences of black segments and white segments in the binarized gradient images is then preferably determined and changes of plane are detected by filtering the histogram to retain only values above a predetermined threshold.

In a preferred embodiment, salient positions in the video document are determined on the basis of the changes of plane detected and on the basis of events corresponding to sudden movements of objects in the scene or sudden movements of the camera.

A first variant includes time segmentation of the video document and partitioning of the space-time video slices created taking account of the portions delimited between the positions of each pair of successive salient positions.

Another variant includes time segmentation of the video document and partitioning of the space-time video slices created by extracting for each salient position a space-time video slice segment with a fixed length forming a junction image straddling that salient position.

A further variant includes time segmentation of the video document and partitioning of the space-time video slices created by extracting for each salient position two space-time video slice segments with a fixed length forming junction images situated on either side of the corresponding salient position.

In another step of the method of the invention, a normalized characteristics vector (v) representing a contour map of the junction image is extracted from each junction image.

According to one feature of the method of the invention, a video fingerprint is constructed for each video document comprising a table of characteristics vectors corresponding to the junction images, a contour map of the space-time video slice created, a binary decision tree resulting from classifying all the characteristics vectors, and a header containing metadata concerning the video document.

According to one aspect of the present invention, the method includes a step of comparing a video fingerprint of a query video document and video fingerprints of a set of candidate video documents in order to detect and locate sequences shared by the query video document and each of the candidate video documents.

More particularly, according to one aspect of the present invention, the method includes a step of comparing a video fingerprint of a query video document and a video fingerprint of a candidate video document, this comparison step comprising a first step, for each of the characteristics vectors of the video fingerprint of the query video document, of searching for the K closest adjacent vectors in a binary decision tree of the video fingerprint of the candidate video document and a second step, for each pair of characteristics vectors consisting of a characteristics vector of the video fingerprint of a query video document and a characteristics vector of the video fingerprint of a candidate video document, of determining the correlation between contour maps of the corresponding junction images and retaining as valid only a pair of characteristics vectors and a pair of corresponding junction images if a correlation score is above a predetermined threshold.

The invention also provides a system for indexing and searching for a query video document in a set of preexisting video documents, characterized in that it comprises a first indexing module comprising a sub-module for constructing a time-space video slice of a video document, for extracting a video fingerprint of each of the preexisting video documents and of each of the query video documents, a second indexing module for indexing video fingerprints extracted from preexisting video documents to create a database of video fingerprints of preexisting video documents, a search module for searching the video fingerprints database of the preexisting video documents for candidate video fingerprints close to a video fingerprint of a query video document, a comparison module for comparing a video fingerprint of a query video document to each of the candidate video fingerprints fingerprint by fingerprint, and a module for selecting pertinent video fingerprints from the candidate video fingerprints as a function of the results supplied by the comparison module.

Thus in order to be able to recognize video documents the invention extracts a space-time video slice (STVS) of a video document for characterization purposes. This, in combination with characterization of junction images formed in a space-time video slice, makes it possible to search for and compare video documents on the basis of these characteristics.

A space-time slice segments video documents so that they can be indexed, compressed, played back at high speed, or recognized through key image detection or characteristic plane extraction.

Other features and advantages of the invention emerge from the following detailed description of particular embodiments provided by way of example, which description is given with reference to the appended drawings, in which.

Figure 1:
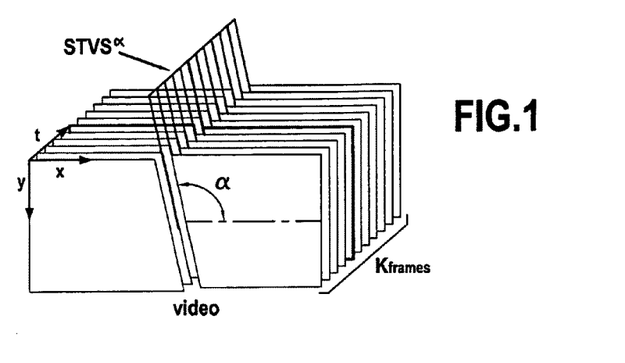
FIG. 1 is a diagram illustrating the extraction in accordance with the invention of a space-time video slice from a video document represented in the form of a parallelepiped of volume that represents the colorimetric values of the pixels during display of the frames of the video documents.
Figure 5:
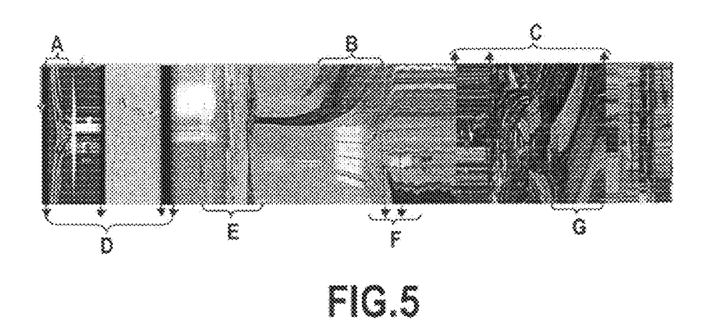
FIG. 5 shows one example of information conveyed by a space-time video slice of a video document.

The construction of a space-time video slice (STVS) from a video document is described first with reference to FIGS. 1 and 5.

A space-time video slice is an image represented in a two-dimensional space, with one space dimension and one time dimension.

A video document can be represented in the form of a parallelepipedal volume produced by juxtaposing along a time axis t K successive frames constituting the video document, each frame being represented by a matrix of pixels in a two-dimensional space x, y.

As represented in FIG. 1, the parallelepipedal volume of a video document can thus be represented in a three-dimensional space, with two dimensions representing space information x, y and one dimension representing time information.

In a video document, successive frames coming from the same source without interruption constitute what is referred to as a plane. In the same plane, there is continuity of visual and space-time information. A sequence of successive planes having a link between them constitutes a scene. Transitions between planes can occur in various ways.

A space-time video slice is the 2D image extracted from the parallelepipedal volume representing the colorimetric values of the pixels during display of the frames. Slicing the parallelepiped in the direction of the time axis t (FIG. 1) produces two portions, the interface between which constitutes a space-time video slice.

In concrete terms, a space-time video slice is constructed by extracting a segment of pixels from each frame throughout the video document represented in the form of a parallelepiped. The side-by-side juxtaposition of these forms the space-time video slice STVS.

As FIG. 1 shows, $STVS^\alpha$ represents the slice that passes through the centers of the K frames constituting a video at an angle $\alpha$ relative to the horizontal lines of the frames. The length $W_{STVS^\alpha}$ of the slice, expressed as number of frames, is equal to K and its height $H_{STVS^\alpha}$ depends on the angle $\alpha$ and the frame dimensions (see FIG. 3).

A space-time video slice is constructed in two stages. In the first, the dimension (height×width in pixels) of the slice is calculated and in the second the values of its pixels are initialized on the basis of the content of the video.

Figure 2:
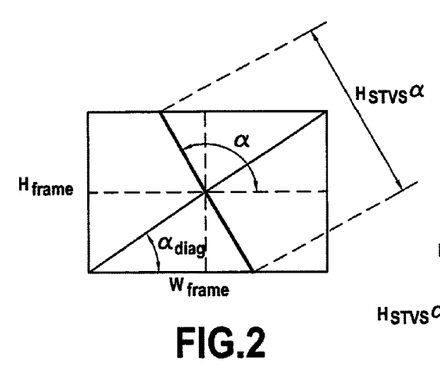
FIG. 2 is a diagram illustrating the extraction of a $k^{th}$ column of pixels to construct a space-time video slice.
Figure 3:
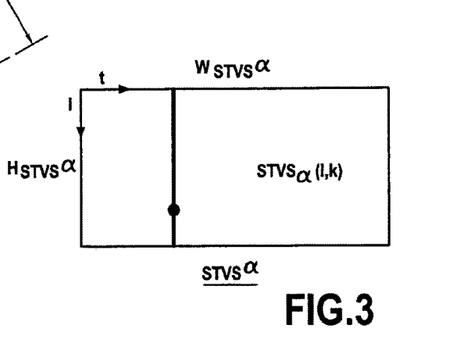
FIGS. 3 and 4 are diagrams illustrating the correspondence between pixels of a space-time video slice and those of the frames of a video document.
Figure 4:
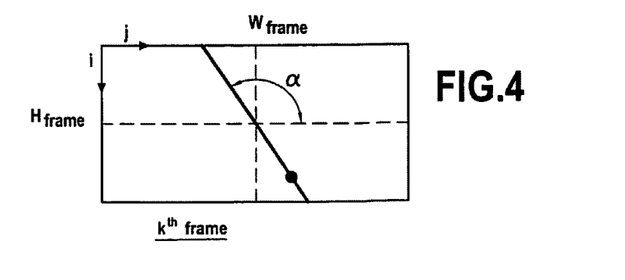

The size of the slice is calculated in the following manner (see FIGS. 2 to 4):

The width $W_{STVS^\alpha}$ of a slice in pixels is equal to the total number of frames used and its height $W_{STVS^\alpha}$ is equal to the length of the segments extracted from each of the frames.

As the equation below shows, calculating the height of an $STVS^\alpha$ depends on the direction of the slice (i.e. the angle $\alpha$), the width ($W_{frame}$) of the frame, and the height ($H_{frame}$) of the frame:

$$H_{STVS^\alpha} = \begin{cases} \left|\frac{W_{frame}}{\cos(\alpha)}\right| & \text{if } (-\alpha_{diag} < \alpha < \alpha_{diag} \text{ or } \pi - \alpha_{diag} < \alpha < \pi + \alpha_{diag}) \\ \left|\frac{H_{frame}}{\sin(\alpha)}\right| & \text{Otherwise} \end{cases} \quad (1)$$

In the above equation, $\alpha_{diag}$ represents the angle between the first diagonal in a frame and one of its horizontal lines, which can be calculated as follows:

$$\alpha_{diag} = \arctan\left(\frac{W_{frame}}{H_{frame}}\right) \quad (2)$$

FIG. 2 more particularly represents the extraction of the $K^{th}$ column of pixels to construct a space-time video slice and FIGS. 3 and 4 represent the correspondence between the pixels of a space-time video slice and those of the frames.

The calorimetric values of the pixels of the slice $STVS^\alpha$ are initialized in the following manner.

When the dimensions of the slice $STVS\alpha$ have been calculated, the calorimetric values of its pixels can be initialized on the basis of the video content. The function for initializing the colorimetric values of its pixels on the basis of the video content is defined by equation 3, in which $l=0 \ldots (H_{STVS_\alpha}-1)$:

$$STVS_\alpha(l, k) = \quad (3)$$
$$Tr_k\left(\left(l - \frac{H_{STVS\alpha}}{2}\right) * \sin(\alpha) + \frac{H_{frame}}{2}, \left(\frac{H_{STVS\alpha}}{2} - l\right) * \cos(\alpha) + \frac{W_{frame}}{2}\right)$$

The representation space is that usually employed for images (the top-left pixel represents the (0,0) point, as shown in FIGS. 3 and 4).

FIG. 5 shows one example of information conveyed by a space-time video slice.

Analyzing the content of a space-time video slice enables to extract a large amount of information concerning the events occurring in a video document, such as changes of plane, movements of objects, type, speed and direction of movements of the camera.

The following events A to G are seen in FIG. 5:
A zooming out
B zooming in
C sudden changes of plane (cut)
D gradual changes of plane (fade in, fade out, cross-fade)
E vertical tilt
F moving objects
G horizontal pan Note that the space-time video slices are good representations of the visual contents of the films and consequently can be good candidates for characterizing animated contents (films, video clips, advertisements). The space-time video slices from different copies of the same film, even if degraded, greatly resemble each other visually.

Space-time video slices are therefore highly robust in the face of the deterioration that video copies may suffer and thus satisfy the criterion of invariance if subjected to the kinds of transformation that a video document can suffer during its life cycle.

Note also that space-time video slices encapsulate hybrid containers holding space information (position of objects, colors, etc.) and time information (movements of objects, movements or operations of camera).

The container of a space-time video slice can be characterized overall without previous subdivision. However, it is then impossible to identify sub-sequences within a video sequence.

Thus local characterization is preferable, the content of a space-time video slice being divided into portions that are characterized separately.

The first step is to partition a space-time video slice and, once segmented, the space-time video slice is used in a characterization step that first extracts for each salient position a portion called the junction image that is then characterized to provide one or more characteristics vectors for each salient position.

Copies of video documents generally have different dimensions (width×height) and different frame rates. Space-time video slices obtained from copies then have different dimensions but the visual contents remain very similar.

Space-time normalization eliminates these differences, and consists in space normalization of the space-time video slices, to solve the problem of variance on changing the frame dimensions, and time normalization, to solve the problem of variance on changing the frame rate. Both kinds of normalization are effected in a single step by redimensioning the space-time video slices. This operation is completed using a fixed reference width $W_{ref}$ and a fixed reference frame rate $R_{ref}$.

Let $W_v$ be the height that corresponds to the space dimension of the slice and $T_v$ be its width, which corresponds to the time dimension. The dimensions $W_N$, $T_n$ of the normalized slice can be obtained from:

$$\begin{cases} W_N = W_{ref} \\ T_N = T_N \times (R_v / R_{ref}) \end{cases} \quad (4)$$

Using an $$N_x \times N_y = \frac{W_N}{W_{réf}} \times \frac{T_v}{T_{réf}}$$

Gaussian window M, the slice redimensioning operation given by the following equation can be effected:

$$STVS_n[i, j] = \quad (5)$$

$$STVS[i, j] * M(i, j) = \sum_{k=-\frac{N_y}{2}}^{k=\frac{N_y}{2}} \sum_{l=-\frac{N_y}{2}}^{l=\frac{N_y}{2}} STVS_n[i, j] \times M(i+k, j+1)$$

Once the slice normalization preprocessing has been effected, time segmentation of the video document can follow.

Time segmentation of a video document detects chronological positions in a video signal that ensure robustness in the face of transformations such as noise, blurriness or redimensioning, for example.

The time density of the positions detected must be neither too low nor too high.

High robustness to transformation and good time distribution in the video signals are obtained by adopting a time segmentation system based mainly on changes of plane, operations of the camera, and sudden movements of objects.

Changes of plane (limits of planes) can be detected by analyzing the extracted space-time video slices. Visually, changes of plane appear as columns indicating a certain discontinuity in time in the slice (on the x axis). This discontinuity separates the adjacent planes of each pair.

Each portion corresponding to a plane of the slice consists of one or more homogeneous areas along the x axis (that represents the time axis insofar as the video is concerned). Each of these areas corresponds to an object or a region of the scene that has been sliced.

The space-time slices contain much information on movement of the objects in the scene and operation of the camera (movements and zooming). If the objects in the scene and the camera remain still throughout the shooting of the plane, the slice consists of juxtaposed horizontal strips.

If only a few objects in the scene are in motion during slicing of the video, transformations occur in the slice in the form of twisting or tilting of the corresponding strips. The deformed strips generally strike the adjacent strips and intermingle with them (see portion F of FIG. 5).

In turn, movement of the camera causes transformations in the slice. Unlike transformations caused by the objects, those caused by the camera have an overall impact on the slice in the form of all the pixels sliding up or down (see part E or G of FIG. 5).

Zooming the camera also causes changes to the slice, manifested as explosion of each pixel into several pixels followed by upward or downward migration of the pixels, as shown in portion B of FIG. 5.

Note that in space-time video slices there is always a certain continuity of homogeneity of colors in the same plane, whether the strips have been deformed or not.

At the level of transition from one plane to another, all objects and regions of the old plane disappear and are immediately replaced by objects and zones of the new plane. This event appears on the slice in the form of columns that show some time discontinuity between adjacent planes (see portions C and D of FIG. 5). Consequently, solving the problem of change of plane detection amounts to solving the problem of detecting and relocating these columns in the slice.

A method based principally on image processing techniques is used to detect the locations of the changes of plane precisely.

Contours present in the slice are detected first by calculating their gradient images. This is followed by binarization of the gradient images to extract their contour maps. Thus changes of plane are located by analyzing the contour maps.

The contours in a digital image f(x,y) resemble borders in which a very high variation is found between the colorimetric values of the pixels and those of their neighbor pixels. Mathematically speaking, the pixels of a contour correspond to the local extrema of the gradient or to the passage through zero of the Laplace function of the two-dimensional signal, represented by the pixel intensity function.

The Sobel detector based on convolution matrices can be used to calculate the gradient image. This 3×3 matrix is convoluted with the image to calculate approximations of the horizontal and vertical derivatives. Let f be the source image, $f_x$ and $f_y$ two images that at each point contain approximations of the horizontal and vertical derivatives of each point, respectively. These images are calculated as follows:

$$f_x = \begin{bmatrix} +1 & +2 & +1 \\ 0 & 0 & 0 \\ -1 & -2 & -1 \end{bmatrix} * f \text{ and } f_y = \begin{bmatrix} -1 & 0 & +1 \\ -2 & 0 & +2 \\ -1 & 0 & -1 \end{bmatrix} * f \quad (6)$$

At each point, the approximations of the horizontal and vertical gradients can be combined as follows to obtain an approximation of the norm of the gradient:

$$f = \sqrt{f_x^2 + f_y^2} \quad (7)$$

In the resulting gradient image, the pixels belonging to the contours have greater amplitudes than the other pixels. They are represented by lighter colors. The following binarization process based on local thresholding can be used to extract contour maps from gradient images.

Firstly, subdivision of the gradient images into blocks of homogeneous sizes.

Secondly, calculation for each block of an adequate threshold for labeling its corresponding pixels.

The local threshold is calculated using the Sauvola local threshold described in the paper "Adaptive document image binarization" published in Pattern Recognition, 33 (2200), pp. 225-236:

$$\begin{cases} T_{i,j} = m(i,j) + \left(1 + k \cdot \left[\frac{\sigma(i,j)}{R} - 1\right]\right) \\ \text{With } k = 0.5 \text{ and } R = 128. \end{cases} \quad (8)$$

In the above equation, m (i, j) represents the mean value of the intensity of the pixels of the block defined by the coordinates i, j and σ (i, j) represents its standard deviation.

Finally, gradient image pixels whose grey level is higher than the local threshold:

$$\begin{cases} T_{i,j} = m(i,j) + \left(1 + k \cdot \left[\frac{\sigma(i,j)}{R} - 1\right]\right) \\ \text{With } k = 0.5 \text{ and } R = 128. \end{cases}$$

are labeled with the code for black while the rest of the pixels are labeled with the code for white:

$$f_{ij}(p[x,y]) = \begin{cases} 0x00 & \text{if } p[x,y] > T_{ij} \\ 0xFF & \text{if } p[x,y] \leq T_{ij} \end{cases} \quad (9)$$

where f(p) is the value of the intensity of the pixel p to be labeled and Ti, j is the local threshold corresponding to the block macro whose coordinates are i, j.

Figure 7A:
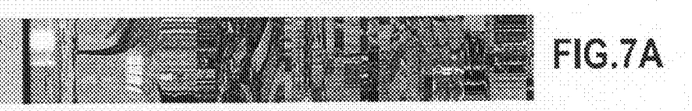
FIGS. 7A to 7C respectively represent one example of a space-time video slice of a video document, a binary image of that space-time video slice, and a histogram of occurrences of pixels belonging to contours for each column in the binary image.
Figure 7B:
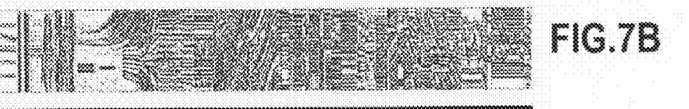
Figure 7C:
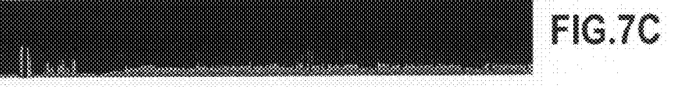

FIG. 7B shows an example of a binary image obtained from the space-time video slice represented in FIG. 7A.

A more refined analysis of the slice shows a succession of black segments (consisting of black pixels) perpendicular to the time axis at locations corresponding to changes of plane. In the same way, the areas that do not correspond to a change of plane are characterized by the presence of white segments.

To facilitate detecting changes of plane, the difference between the values corresponding to changes of plane and their adjacent points are amplified. This is obtained by replacing the histogram of occurrences of pixels by the histogram of occurrence of black segments and white segments, in accordance with the following process, in which n_black_seg is the number of occurrences of segments of n contiguous black pixels and n_white_seg is the number of occurrences of segments of n contiguous white pixels:

For each Column j of the binary image do
Calculate the number of n_black_seg segments
Calculate the number of n_white_seg segments
If (n_black_seg>n_white_seg)
    Histogram[j]=0;
Else
    Histogram [j]=n_black_seg−n_white_seg;
End for;

The histogram obtained is filtered to retain only values above an experimental threshold:

$$\text{Histogram}[j] = \begin{cases} 0 & \text{if Histogram}[j] < \text{threshold} \\ \text{Histogram}[j] & \text{if Histogram}[j] \geq \text{threshold} \end{cases} \quad (10)$$

Figure 8A:
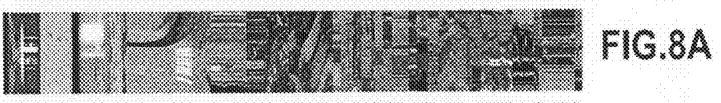
FIGS. 8A and 8B respectively represent an example of a space-time video slice of a video document and a histogram of positions of changes of plane corresponding to this example of a space-time video slice.
Figure 8B:
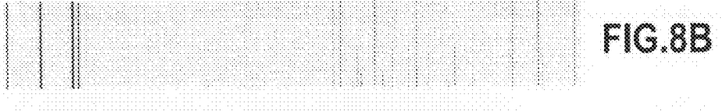

FIG. 8B illustrates the result obtained after calculating and then filtering the histogram of the binary image of the space-time video slice in FIG. 8A. Note that non-zero amplitudes correspond to change of plane positions.

Figure 9:
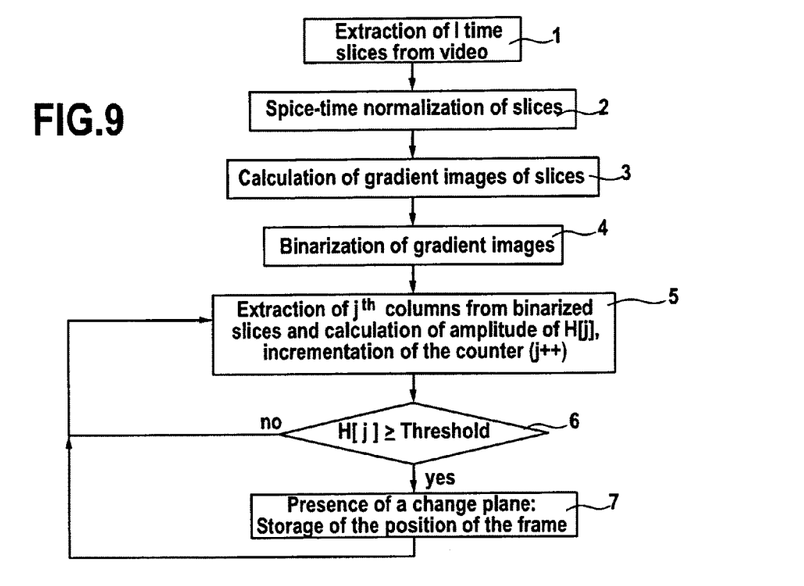
FIG. 9 is a flowchart corresponding to one example of a method of detecting changes of plane in a space-time video slice of a video document.

The FIG. 9 flowchart summarizes the change of plane detection steps.

In the step 1, the I space-time video slices are extracted from a video document. There follows the step 2 of space-time normalization of the slices. There follow first the step 3 of calculating the gradient images of the slices and then the step 4 of binarizing the gradient images.

Next the histogram of the segments is constructed and changes of plane are detected.

For this purpose, in the step 5, the $j^{th}$ column of the binarized slices is extracted and the amplitude of the hop H[j] is calculated. The next step is the step 6, which is a test to determine if H[j] is or is not greater than or equal to a threshold (Threshold).

If the result of the step 6 test is yes, the next step is the step 7 of signaling the presence of a change of plane and storing the position of the corresponding frame, followed by a return to the step 5 and incrementing of the counter (j++).

If the result of the step 6 test is no, the next step is the step 5 of incrementing of the counter (j++).

To be able to detect copies of video documents in a robust manner, characterization is carried out using detected chronological positions known as "salient positions" that must be identical in the original video document and most copies. Changes of plane constitute good candidates for constituting the required salient positions because they are robust to the various transformations that a video document can undergo.

To increase and strengthen the number of salient positions, events corresponding to sudden movements of objects in the filmed scene and sudden operations of the camera can sometimes also be taken into account. These events cause effects in the space-time video slices that are similar to the effects of changes of plane and are therefore simple to detect by adapting the detection threshold.

Figure 6A:
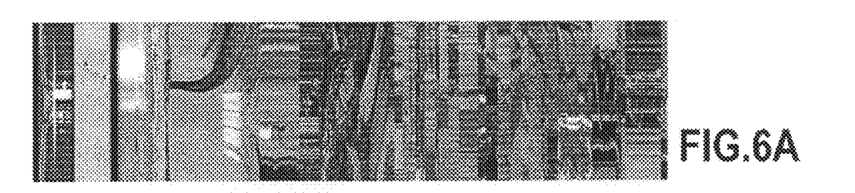
FIGS. 6A and 6B are diagrams showing one example of a space-time video slice of a video document and different types of events used for time segmentation of the space-time video slice.
Figure 6B:
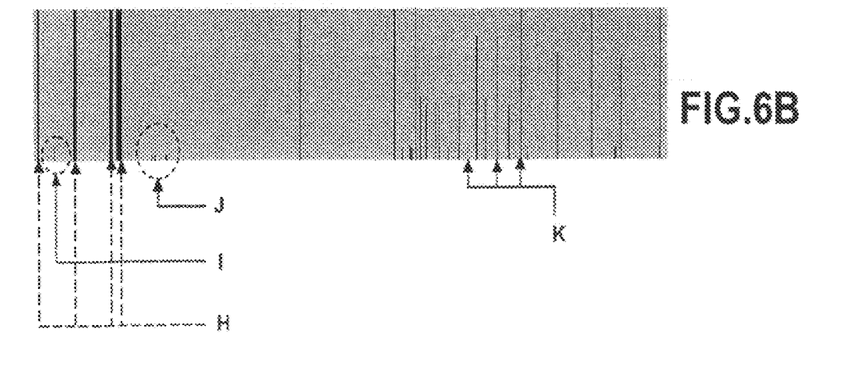

FIG. 6B shows the types of events used in the time segmentation of an example of a video document whose space-time video slice is shown in FIG. 6A.

There are seen in FIG. 6B events H consisting of gradual changes of plane, events I consisting of new positions corresponding to a sudden movement of the object, events J consisting of new positions corresponding to sudden operations of the camera, and events K corresponding to sudden changes of plane.

The space-time video slices can be positioned on the basis of the salient positions previously detected.

Figure 10A:
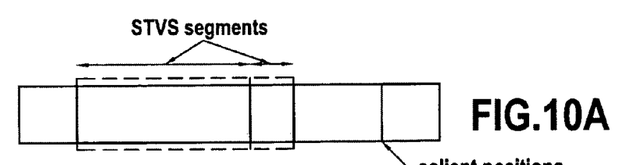
FIGS. 10A to 10C are diagrams illustrating three examples of possible subdivision of a space-time video slice of a video document.
Figure 10B:
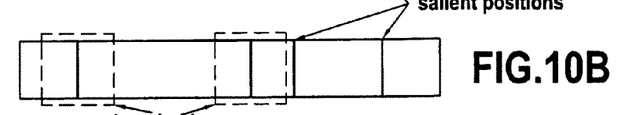
Figure 10C:
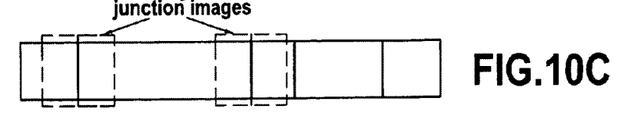

FIGS. 10A to 10C show the following three options, respectively:

a) the first option takes the portions delimited by each pair of successive salient positions (FIG. 10A);

b) the second option extracts an STVS segment with a fixed length for each salient position straddling that position (FIG. 10B);

c) the third option extracts two STVS segments for each salient position with a fixed length, one situated to the left of the position and the other to its right (see FIG. 10C). These segments are referred to as "junction images" in the context of FIGS. 10B and 10C.

The second and third ways of creating junction images, shown in FIGS. 10B and 10C, are considered more specifically below.

To characterize junction images, there is a broad palette of approaches that can be classified into three main axes, as follows: color (histogram of colors, dominant colors, color moments, etc.), shape (orthogonal moments, Fourier and Wavelet coefficients, etc.), and texture (LBP, Gabor, etc.), as indicated in particular in the document WO 2005/055086 relating to characterizing multimedia documents.

A further method of characterizing contour maps of junction images by the contour spatial distribution matrix method is described below.

This new descriptor characterizes contour maps of an image by producing a normalized characteristics vector V for each junction image. To obtain the characteristics vector V, the first step is to superpose a grid of r cells with M columns and N rows on the contour map of the junction image (see FIG. 11).

The grid is then scanned from left to right and from top to bottom, calculating the approximate value $v_{i,j}$ for each of the cells. That value corresponds to the number of pixels belonging to the contour in each of the cells:

$$v_{i,j} = \sum_{p \in Cell[i,j]} f[p] \quad (11)$$

In the above equation, cell [i,j] is the cell produced by the intersection of the $i^{th}$ row and the $j^{th}$ column and f[p] is the function that represents the contour map of the junction image defined in the following formula:

$$f(p) = \begin{cases} 1 & \text{if the pixel } p \text{ belongs to the contour} \\ 0 & \text{otherwise} \end{cases} \quad (12)$$

To reduce the sensitivity of the descriptor to noise, the values $v_{i,j}$ are normalized relative to the total number of pixels belonging to the contours of the junction image:

$$nv_{i,j} = \frac{v_{i,j}}{\sum_{p \in junction\ Image} f(p)} \quad (13)$$

The characteristics vector is obtained by concatenating all the values that correspond to the cells of the grid.

Figure 11:
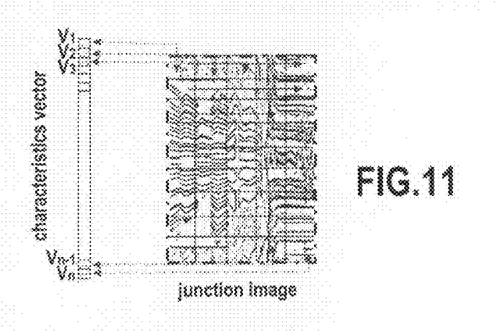
FIG. 11 is a diagram illustrating the extraction of characteristics vectors of a junction image associated with a salient position of a space-time video slice of a video document.

Characterizing all the junction images for a video document produces a large number of characteristics vectors like that shown in FIG. 11.

These vectors can be represented in a vector space having a number of dimensions greater than or equal to the number of dimensions of the characteristics vectors. Each junction image is then represented by a point in that space.

For improved management of all these descriptors, an appropriate structure can be used in the form of a binary tree or dendrogram. This is effected by successively distributing the points into groups or classes (see FIG. 12). The set of all points (characteristics vectors) is first divided into two classes, the class C1 and the class C2 in the FIG. 12 example. Each of these classes is then in turn divided into two sub-classes. The division process is iterated for each sub-class until a predefined maximum depth is reached. Classes that have no sub-class are called leaves.

Figure 12:
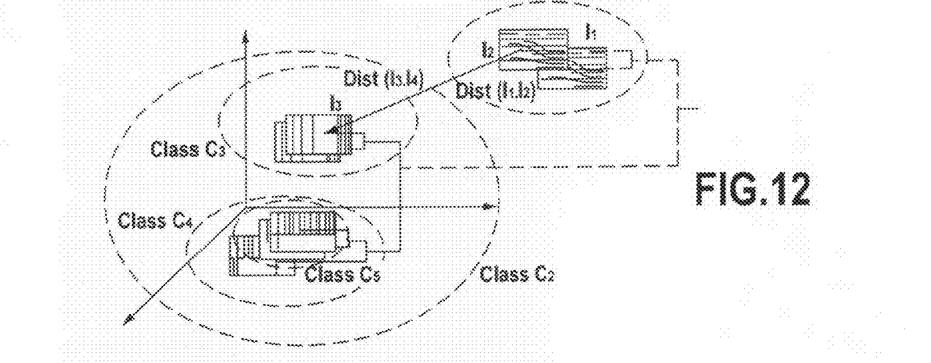
FIG. 12 is a diagram illustrating the representation in a vector space of a set of characteristics vectors associated with a set of junction images of a space-time video slice of a video document.

In the FIG. 12 example, the class C2 is divided into sub-classes C3 and C4.

Optimization of the distribution takes into account the following two criteria:
  maximizing intra-class similarity;
  minimizing inter-class similarity.

The document WO 2005/055086 provides more details of the process for constructing this kind of binary tree.

Figure 13:
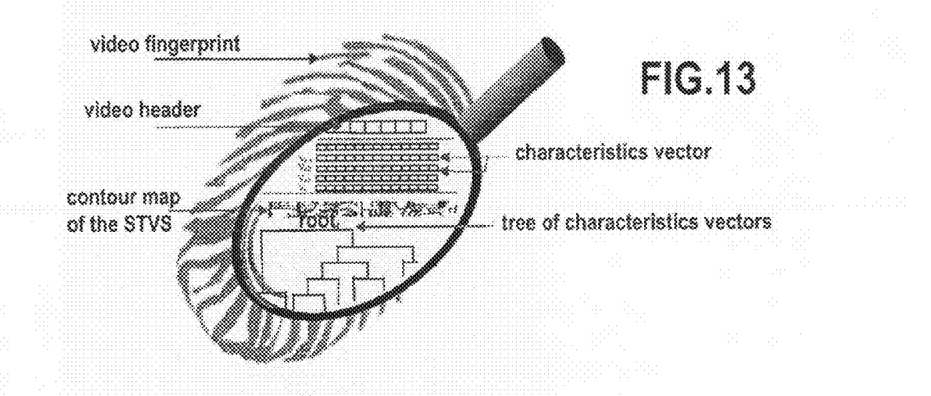
FIG. 13 is a diagram illustrating the structure of a fingerprint of a video document.

The above steps construct fingerprints of the video documents, each video document fingerprint consisting of a number of components resulting from the indexing process, namely (see FIG. 13):

the table of the characteristics vectors corresponding to the junction images; each of these vectors is identified by its chronological position (salient position) in the video;
  the contour map of the space-time video slice of the video;
  the decision binary tree resulting from the classification of all the characteristics vectors;
  finally, a header containing metadata concerning the video, such as: name, type (avi, mpg, flv, etc.), codec, duration, etc.

Once the fingerprint of the video has been constructed, the presence of the video document is no longer necessary in the remainder of the modules of the system, especially the search module and the module for constructing a fingerprints database.

To compare two documents, it suffices to compare their fingerprints. This type of comparison generally relates to query videos for which the candidate video is known.

To search a large database of video documents (containing thousands of videos)-for a video sequence or a portion of a video sequence for which the candidate video is not known, one possible solution would be to compare the query fingerprint sequentially with all the fingerprints of the videos in the database. This solution is very costly in computation time, however, especially when it relates to a task that is intensively used on-line.

To avoid these drawbacks and to conduct fast and efficient searches in a database of documents, a structure called a fingerprints database is constructed. The fingerprints database is created using all the fingerprints corresponding to the video documents in the video documents database.

The process of constructing a fingerprints database for a video documents database includes a step of recovering the characteristics vectors of each of the individual fingerprints of the video documents, a step of reclassifying the characteristics vectors, and a step of generating the fingerprints database.

Thus the first step is to extract all its characteristics vectors from each fingerprint. All these vectors are grouped in the same vector space and a classification process similar to that used in calculating the fingerprints is used to construct a global binary tree for all the characteristics vectors of the video documents database.

Figure 14:
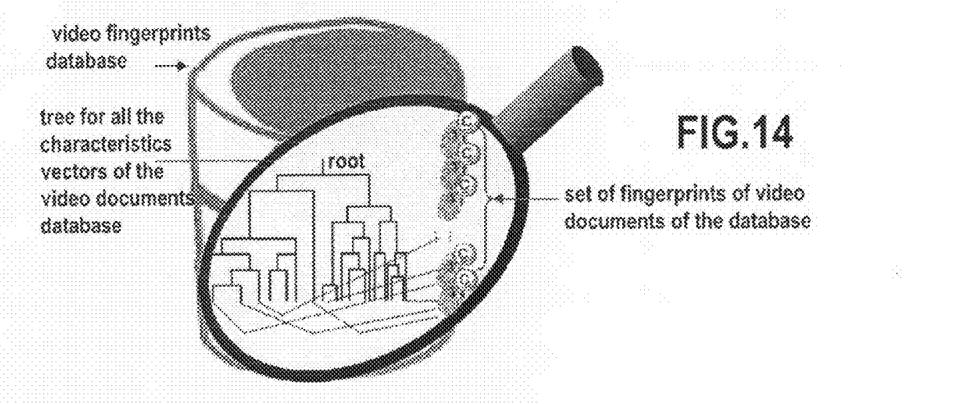
FIG. 14 is a diagram illustrating the structure of a database of fingerprints associated with a set of video documents.

The major difference between the tree of a fingerprints database and that of a fingerprint is that the characteristics vectors belonging to a leaf of a tree of a fingerprint are identified by their chronological positions in the video document, whereas in a fingerprints database they are identified by their chronological positions and the identifier of the video document for which they were calculated. FIG. 14 shows the structure of a fingerprints database.

With the decision tree, the fingerprints database contains all of the video fingerprints with which it was constructed.

Generating the fingerprints for a video documents database and generating a fingerprints database are tasks that are costly in computation time. For this reason, this portion of the process is executed totally off-line. In contrast, the processing that corresponds to the search is executed on-line.

The indexing method of the invention can be applied to information search systems comprising a database of video documents to be indexed and a query document that is liable to contain sequences from the whole of one or more video documents from the database. The query video document can be an identical copy or a copy derived from one or more documents from the database. A derived document is the result of manipulating a protected video document using a sequence of visual or non-visual transformations (change of contrast, resizing, compression, change of CODEC, addition of blurriness, etc.).

When searching in this kind of context, it is necessary to measure the pertinence of the search results in relation to the problem of detecting video sequences shared between the query video document and the video documents in the database.

The definition of this pertinence depends on the application envisaged. Thus a video document from the database can be considered pertinent if the entirety of that video document is shared with the entirety of the query video document. This kind of definition is appropriate for problems such as eliminating duplicate documents from a documents database, for example. In contrast, it can also be agreed that a video document is considered pertinent if it shares a sequence with the query video document without sharing all the sequences of the query video document.

Figure 18:
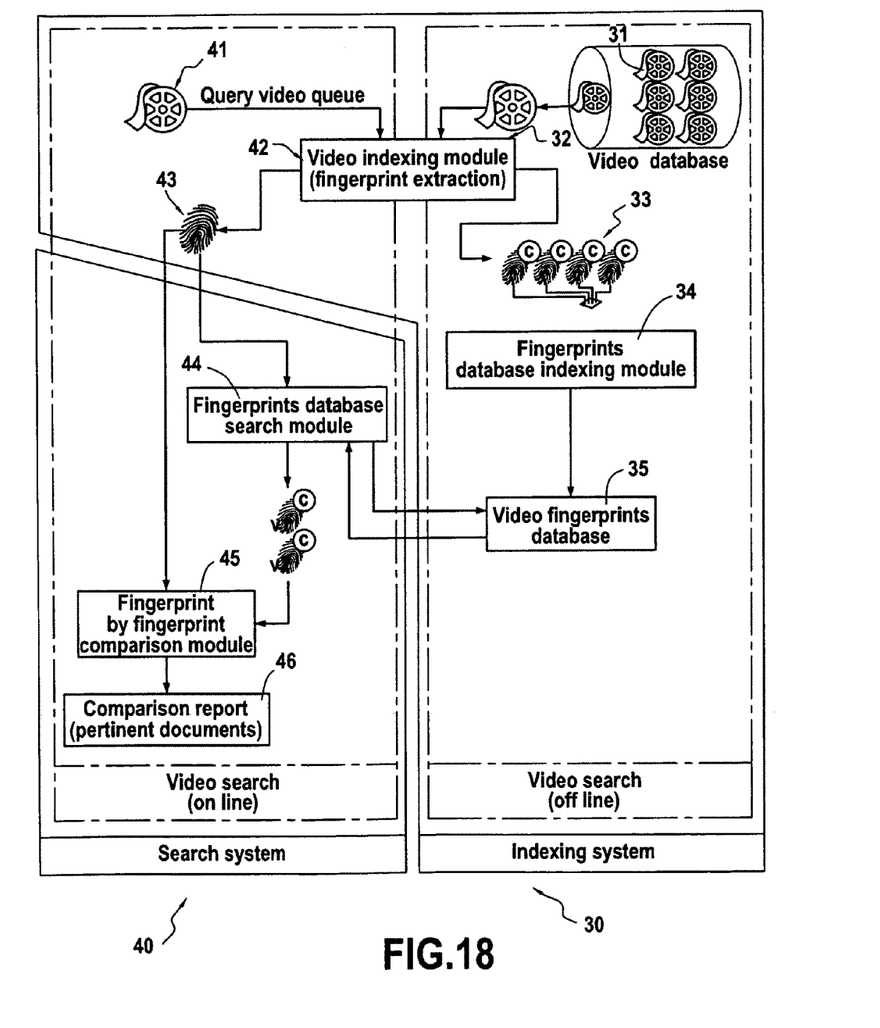
FIG. 18 shows the general architecture of a system using the invention for indexing and searching for video documents.

FIG. 18 shows the general architecture of an indexing and searching system adapted to implement the indexing method of the invention.

The indexing system 30 includes a first module 32 for indexing video documents included in a video documents database 31 and extracting a fingerprint 33 for each of the indexed video documents. The indexing system 30 also includes a second module 34 for indexing the fingerprints 33 of the indexed video documents in order to construct a video fingerprints database 35. The two modules 32 and 34 operate off-line.

In contrast, the search system 40, operates entirely on-line. Starting with a query video document queue 41, a video indexing module 42, which can be combined with the module 32, is called first, for each query document, to index the query video document and to generate its fingerprint 43. When the fingerprint 43 has been calculated it is sent to a coarse search module 44 in the video fingerprints database 35 to determine candidate video documents from the video documents database 31 likely to be pertinent. A fingerprint by fingerprint comparison is then effected in a module 45 between the fingerprint 43 of the query video document and each of the fingerprints of the candidate video documents, to detect and locate all sequences shared between the query video document and the candidate video documents. As this process proceeds, a search report 46 is constructed and can be analyzed for high-level applications.

Figure 15:
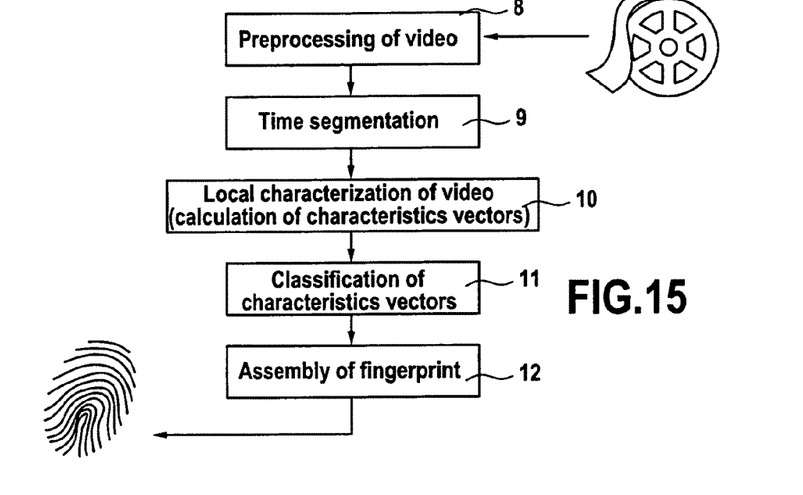
FIG. 15 is a diagram showing one example of a video document fingerprint extraction module.

The fingerprint extraction module 32 or 42 is shown diagrammatically in FIG. 15.

After a step 8 of preprocessing a video document, there follows a step 9 of temporal segmentation for detecting salient positions in a video signal. The salient positions are used in the next step 10 for characterizing the video signal to locate the key video sequences to be characterized. The final result of characterization consists of one or more characteristics vectors for each salient position.

At this stage of the process, many characteristics vectors have been obtained for each video document.

To facilitate and accelerate searching the characteristics vectors database, the step 11 uses a classification process to create an optimum navigation map in the form of a binary tree appropriate to the characteristics vectors of the video. To this end, the characteristics vectors are classified by recursive division guided by the similarity of the vectors.

Finally, in the step 12, the characteristics vectors and the navigation tree are assembled and assigned to a header containing metadata concerning the video (such as name, number of frames per second, frame size, duration, compression format, etc.) to form the fingerprint.

The fingerprint by fingerprint comparator module 45 complements the fingerprint/fingerprints database search module. Comparing a fingerprint to a fingerprints database detects fingerprints likely to be pertinent, but does not provide a precise response to questions such as: what duration was found? And in what position?

It is for this reason, and to respond to this requirement, that the fingerprint by fingerprint comparator module 45 is used, its main role being to detect and locate video sequences common to two video documents.

The fingerprint by fingerprint comparison task is carried out at two processing levels. At the first level, for each of the characteristics vectors of the query fingerprint, a search is conducted for the K closest adjacent vectors in the binary decision tree of the candidate fingerprint (fingerprint of the original video). This is achieved using a characteristics vector/decision tree search method defined above. For each query characteristics vector, this method finds all candidate vectors likely to be pertinent.

To eliminate candidate vectors that are not pertinent, a second level of comparison is used, but this time the comparison applies to the contour maps of the junction images and not to the corresponding characteristics vectors. The correlation between the contour maps of the corresponding junction images is calculated for each pair of query/candidate characteristics vectors. The formula Corr for this correlation is as follows:

$$\text{Corr}(IM\_Q, IM\_C) = \frac{\sum_{i=0}^{N} \sum_{j=0}^{M} \text{AND}(\text{NOT}(IM\_Q[i,j]), \text{NOT}(IM\_C[i,j]))}{M \times N}$$

In the above formula, IM_Q, IM_C, represent the contour maps of the query and candidate junction images, N×M represents the dimensions of the two junction images IM_Q and IM_C, and IM_Q represents the binary value of the pixel resulting from the intersection of the $i^{th}$ and the $j^{th}$ column in the query and candidate junction images (this value is equal to 0 if the pixel belongs to the contours and has some other value if it does not).

The correlation calculation for two junction images gives a correlation score; if this score is above an experimentally defined threshold th, the pertinence of the query/candidate pair is confirmed, whereas if it is not the pair is considered not to be pertinent (see the formula below):

$$\begin{cases} \text{if } \text{Corr}(IM\_Q, IM\_C) > th \text{ then } (IM\_Q, IM\_C) \text{ is a valid pair} \\ \text{else } (IM\_Q, IM\_C) \text{ is an invalid pair} \end{cases}$$

For each valid pair of junction images the pair consisting of their chronological positions (that is the identifier of the characteristics vector) in the contour maps of their space-time video slices is recovered. From these two positions, a correlation is undertaken portion by portion between the contour map of the query STVS and that of the candidate STVS.

Figure 16:
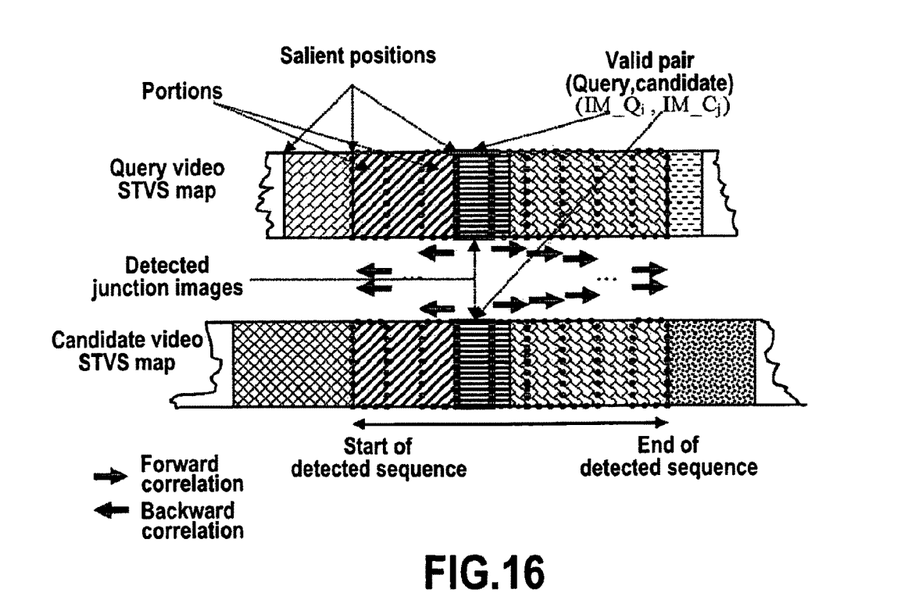
FIG. 16 is a comparative diagram showing the location of sequences shared between a query video document and a candidate video document during comparison of a query video document and a candidate video document.
Figure 17:
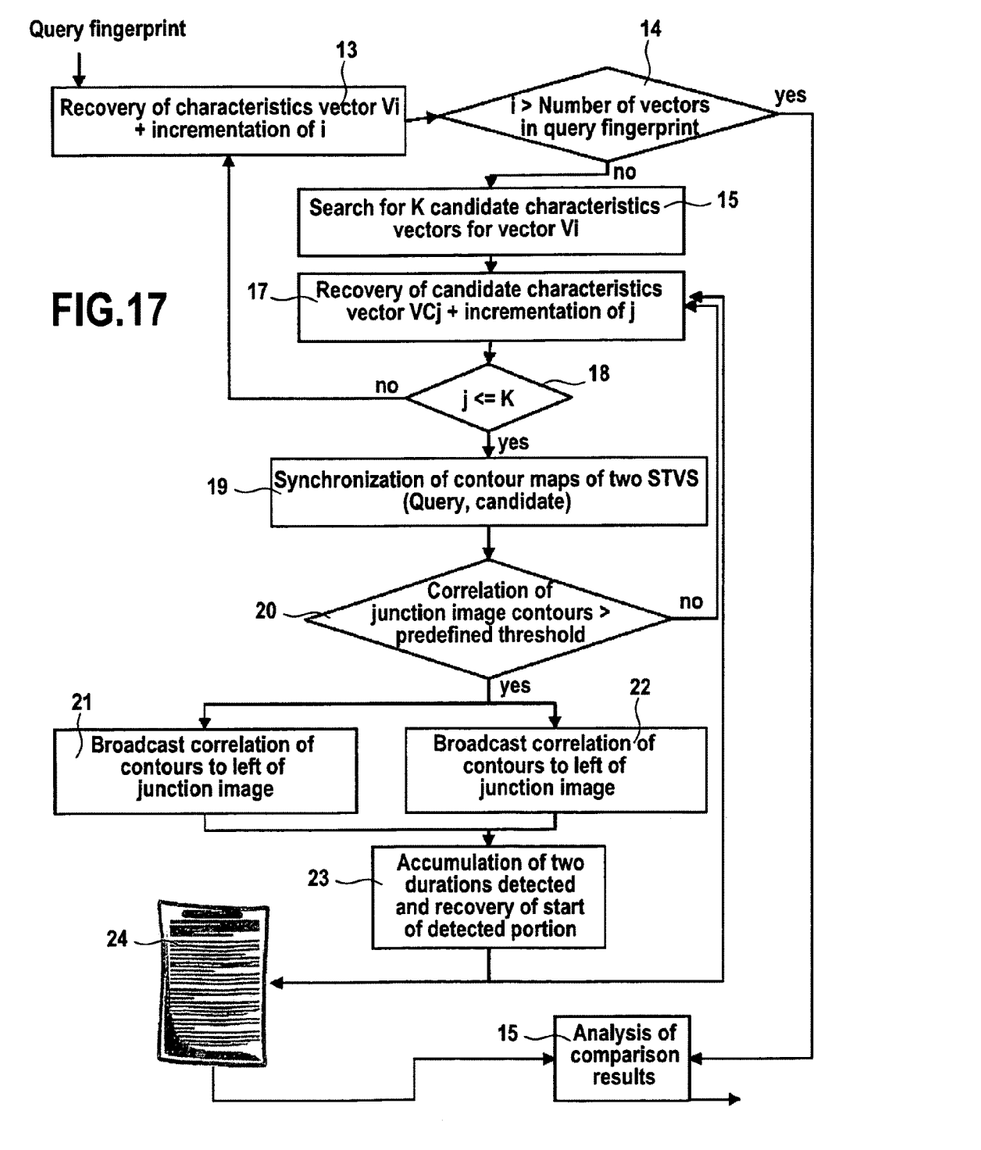
FIG. 17 is a flowchart illustrating a method comparing a query fingerprint of a query video document and a candidate fingerprint of a candidate video document in order to detect a video sequence shared by the two video documents.

As represented in FIG. 16, which shows the location of sequences shared between a query video document and a candidate video document, starting from a pair of valid junction images (IM_Q, IM_C$_j$), their corresponding total contour maps are synchronized. From the position of the start of the two correlated junction images, a backward portion by portion correlation is effected, whereas from the positions of the end of the junction images, a forward portion by portion correlation is effected. Once correlation between the two directions (forward and backward) is halted by non-correlated portions, the start and end positions of the correlation are recovered to calculate the duration of the video sequence common to the two video documents. This processing is repeated for each pair of valid junction images. FIG. 17 summarizes the fingerprint by fingerprint comparison process.

Thus, starting from a query fingerprint, in a step 13 the characteristics vector $V_i$ is recovered, i having been incremented.

There follows in the step 14 a test to determine if i is greater than the number of vectors in the query fingerprint. If so, the next step is the step 15 of analyzing the comparison results. If not, the next step is the step 16 of searching for the K candidate characteristics vectors for the vectors $V_i$, followed by the step 17 of recovering the candidate characteristics vector $VC_j$ by incrementing j.

There follows in the step 18 a test to examine if j is less than or equal to K. If not, the next step is the step 13; otherwise the next step is the step 19 of synchronizing the contour maps of the query and answer space-time video slices.

There follows in the step 20 a test to examine if the correlation of the contours of the junction images is above a predefined threshold. If not, the next step is the step 17 of recovering the next candidate characteristics vector. If the result of the step 20 test is positive, there follow the steps 21 and 22 of broadcasting the correlation of the contours to the left of the junction image for the query STVS and the candidate STVS, respectively.

In the step 23, the two durations detected are added together and the start of the detected portion is recovered and, after the information is stored, in the step 24, the next step is the step 17. The final analysis of the comparison results on the basis of the information stored in the step 24 can be effected in the step 15 if the test 14 step shows that all characteristics vectors in the query fingerprint have been processed.

Generally speaking, according to the invention, when indexing a video document, a space-time video slice is extracted for the purpose of characterizing images formed in a space-time video slice, or a portion of those images, the method carrying out searches and comparisons between a query video document and one or more candidate video documents based on those characterizations.

More particularly, space-time video slices are segmented in order to extract them from a video document.

Segmenting video documents enables diverse applications to be used, such as compressing, high-speed reading and indexing of video documents and recognition of key images or objects.

Extracting "imagettes" around junction images also provides for recognizing or detecting the start and the end of known sequences, for example.

The invention claimed is:

1. A method of indexing a video document, comprising the following steps:
   (a) representing the video document in the form of a parallelepipedal volume obtained by juxtaposing on a time axis (t) K successive frames constituting the video document, each frame being represented by a matrix of pixels in a two-dimensional space (x, y); and
   (b) constructing a space-time video slice ($STVS^\alpha$) of the video document by extracting a one-dimensional segment of pixels for each frame of the video document in the same direction at a predetermined angle $\alpha$ relative to a first direction (x) of the frames, juxtaposing the K segments of pixels corresponding to the K frames on a time axis (t) to form a space-time video slice ($STVS^\alpha$) of length ($WSTVS^\alpha$) defined by the K juxtaposed pixel segments and of height ($HSTVS^\alpha$) equal to the length of the segments extracted from each of the frames, which length is a function of the dimension of the frames in the second direction (y) and the angle $\alpha$, and initializing the colorimetric values of the pixels of the K segments of the space-time video slice ($STVS^\alpha$) on the basis of the content of the segments extracted from the K frames of the video document, characterized in that the height ($HSTVS^\alpha$) of a space-time video slice ($STVS^\alpha$) depends on the angle $\alpha$ formed by the K segments of the space-time video slice ($STVS^\alpha$) relative to the first direction (x) of the frames, the width ($W_{frame}$), and the height ($H_{frame}$) of the frame, as follows:

$$H_{STVS^\alpha} = \begin{cases} \left|\dfrac{W_{frame}}{\cos\alpha}\right| & \text{if } (-\alpha_{diag} < \alpha < \alpha_{diag} \text{ or } \pi - \alpha_{diag} < \alpha < \pi + \alpha_{diag}) \\ \left|\dfrac{H_{frame}}{\sin\alpha}\right| & \text{Otherwise} \end{cases}$$

where $\alpha_{diag}$ represents the angle between the first diagonal interframe and one of the lines in the first direction x, and where:

$$\alpha_{diag} = \arctan\left(\frac{W_{frame}}{H_{frame}}\right).$$

2. A method of indexing a video document, comprising the following steps:
   (a) representing the video document in the form of a parallelepipedal volume obtained by juxtaposing on a time axis (t) K successive frames constituting the video document, each frame being represented by a matrix of pixels in a two-dimensional space (x, y); and
   (b) constructing a space-time video slice ($STVS^\alpha$) of the video document by extracting a one-dimensional segment of pixels for each frame of the video document in the same direction at a predetermined angle $\alpha$ relative to a first direction (x) of the frames, juxtaposing the K segments of pixels corresponding to the K frames on a time axis (t) to form a space-time video slice ($STVS^\alpha$) of length ($WSTVS^\alpha$) defined by the K juxtaposed pixel segments and of height ($HSTVS^\alpha$) equal to the length of the segments extracted from each of the frames, which length is a function of the dimension of the frames in the second direction (y) and the angle $\alpha$, and initializing the colorimetric values of the pixels of the K segments of the space-time video slice ($STVS^\alpha$) on the basis of the content of the segments extracted from the K frames of the video document, characterized in that the colorimetric values of the l pixels of the K segments of the space-time video slice ($STVS^\alpha$) are initialized on the basis of the content of the segments extracted from the K frames of the video document by the following function:

$$STVS_\alpha(l, k) = Tr_k\left(\left(l - \frac{H_{STVS_\alpha}}{2}\right)*\sin(\alpha) + \frac{H_{frame}}{2}, \left(\frac{H_{STSV_\alpha}}{2} - l\right)*\cos(\alpha) + \frac{W_{frame}}{2}\right)$$

where:

$l = 0 \ldots (H_{STVS_\alpha} - 1);$ and $Tr_k$ is a function enabling determination of values representing colorimetric components of all pixels (l, k) of each of the k segments of pixels extracted in the respective k frames.

3. A method according to claim 1, characterized in that space-time normalization of the space-time video slices ($STVS^\alpha$) is effected by space normalization of the dimensions of the frames relative to a fixed reference height ($W_{ref}$) and time normalization of the number of frames per second relative to a fixed reference number of frames per second ($R_{ref}$).

4. A method according to claim 1, characterized in that contours present in space-time video slices ($STVS^\alpha$) are detected by calculating gradient images of the space-time video slices ($STVS^\alpha$) and binarizing those gradient images.

5. A method according to claim 4, characterized in that a histogram of occurrences of black segments and white segments in the binarized gradient images is determined and changes of plane are detected by filtering the histogram to retain only values above a predetermined threshold.

6. A method according to claim 5, characterized in that salient positions in the video document are determined on the basis of the changes of plane detected and on the basis of events corresponding to sudden movements of objects in the scene or sudden movements of a camera.

7. A method according to claim 6, characterized in that it includes time segmentation of the video document and partitioning of the resulting space-time video slices ($STVS^\alpha$) taking account of the portions delimited between the positions of each pair of successive salient positions.

8. A method according to claim 6, characterized in that it includes time segmentation of the video document and partitioning of the resulting space-time video slices ($STVS^\alpha$) by extracting for each salient position a space-time video slice ($STVS^\alpha$) segment with a fixed length forming a junction image straddling that salient position.

9. A method according to claim 8, characterized in that a normalized characteristics vector (V) representing a contour map of the junction image is extracted from each junction image.

10. A method according to claim 8, characterized in that a video fingerprint is constructed for each video document comprising a table of characteristics vectors corresponding to the junction images, a contour map of the space-time video slice created, a binary decision tree resulting from classifying all the characteristics vectors, and a header containing metadata concerning the video document.

11. A method according to claim 10, characterized in that it includes a step of comparing a video fingerprint of a query video document and video fingerprints of a set of candidate video documents in order to detect and locate sequences shared by the query video document and each of the candidate video documents.

12. A method according to claim 10, characterized in that it includes a step of comparing a video fingerprint of a query video document and a video fingerprint of a candidate video document, this comparison step comprising a first step, for each of the characteristics vectors of the video fingerprint of the query video document, of searching for the K closest adjacent vectors in a binary decision tree of the video fingerprint of the candidate video document and a second step, for each pair of characteristics vectors consisting of a characteristics vector of the video fingerprint of a query video document and a characteristics vector of the video fingerprint of a candidate video document, of determining the correlation between contour maps of the corresponding junction images and retaining as valid only a pair of characteristics vectors and a pair of corresponding junction images if a correlation score is above a predetermined threshold.

13. A method according to claim 6, characterized in that it includes time segmentation of the video document and partitioning of the space-time video slices ($STVS^\alpha$) created by extracting for each salient position two space-time video slice ($STVS^\alpha$) segments with a fixed length forming junction images situated on either side of the corresponding salient position.

14. A method according to claim 13, characterized in that a normalized characteristics vector (V) representing a contour map of the junction image is extracted from each junction image.

15. A method according to claim 13, characterized in that a video fingerprint is constructed for each video document comprising a table of characteristics vectors corresponding to the junction images, a contour map of the space-time video slice created, a binary decision tree resulting from classifying all the characteristics vectors, and a header containing metadata concerning the video document.

16. A method according to claim 15, characterized in that it includes a step of comparing a video fingerprint of a query video document and video fingerprints of a set of candidate video documents in order to detect and locate sequences shared by the query video document and each of the candidate video documents.

17. A method according to claim 15, characterized in that it includes a step of comparing a video fingerprint of a query video document and a video fingerprint of a candidate video document, this comparison step comprising a first step, for each of the characteristics vectors of the video fingerprint of the query video document, of searching for the K closest adjacent vectors in a binary decision tree of the video fingerprint of the candidate video document and a second step, for each pair of characteristics vectors consisting of a characteristics vector of the video fingerprint of a query video document and a characteristics vector of the video fingerprint of a candidate video document, of determining the correlation between contour maps of the corresponding junction images and retaining as valid only a pair of characteristics vectors and a pair of corresponding junction images if a correlation score is above a predetermined threshold.

* * * * *

UNITED STATES PATENT AND TRADEMARK OFFICE
CERTIFICATE OF CORRECTION

PATENT NO. : 8,369,407 B2
APPLICATION NO. : 12/154671
DATED : February 5, 2013
INVENTOR(S) : Aissa Saoudi et al.

Page 1 of 1

It is certified that error appears in the above-identified patent and that said Letters Patent is hereby corrected as shown below:

In the Specification

Column 2, line 27, "1 pixels" should read -- $\ell$ pixels --.

Signed and Sealed this
Twelfth Day of November, 2013

Teresa Stanek Rea
*Deputy Director of the United States Patent and Trademark Office*